United States Patent [19]

Piestert

[11] 4,343,921

[45] Aug. 10, 1982

[54] ADHESIVE COMPOSITION

[75] Inventor: Gerhard Piestert, Schriesheim, Fed. Rep. of Germany

[73] Assignee: USM Corporation, Farmington, Conn.

[21] Appl. No.: 90,513

[22] Filed: Nov. 2, 1979

[30] Foreign Application Priority Data

Nov. 6, 1978 [GB] United Kingdom .............. 43370/78

[51] Int. Cl.$^3$ .......................... C08F 4/00; C08F 20/20; C08F 20/26
[52] U.S. Cl. .................................. 525/310; 156/332; 428/442; 428/522; 525/256; 525/529; 525/531; 525/922; 526/204; 526/205; 526/320; 526/323.1; 526/323.2
[58] Field of Search .................... 526/204, 205, 323.1, 526/320, 323.2, 273; 525/256, 310, 529, 531, 922

[56] References Cited

U.S. PATENT DOCUMENTS

| | | | |
|---|---|---|---|
| 3,207,815 | 9/1965 | Joo et al. .............................. | 526/205 |
| 3,901,858 | 8/1975 | Sugiyama et al. ................ | 526/323.2 |
| 4,034,145 | 7/1977 | Gruber et al. .................... | 526/323.1 |
| 4,038,475 | 7/1977 | Frauenglass et al. ............. | 526/323.1 |
| 4,180,640 | 12/1979 | Melody et al. ................... | 526/323.1 |

FOREIGN PATENT DOCUMENTS

| | | |
|---|---|---|
| 1181287 | 2/1970 | United Kingdom . |
| 1231345 | 5/1971 | United Kingdom . |
| 1307995 | 2/1973 | United Kingdom . |
| 1469643 | 4/1977 | United Kingdom . |

*Primary Examiner*—Harry Wong, Jr.
*Attorney, Agent, or Firm*—John P. Morley

[57] ABSTRACT

An improved adhesive composition formed by combining two parts. One part includes one or more polymerizable materials comprising one or more acrylate or methacrylate groups per molecule and a source of free radicals comprising an organic peroxide, hydroperoxide, perester or peracid. The other part includes an activator which is a specifically defined organic material which can cooperate with the source of free radicals to initiate addition polymerization of the polymerizable materials.

21 Claims, No Drawings

ADHESIVE COMPOSITION

BACKGROUND OF THE INVENTION (1) The Field of the Invention

This invention relates to adhesives. More precisely this invention relates to improved reactive fluid adhesives and activators for such adhesives.

(2) Description of the Prior Art

Polymerizable compositions are known which are believed to cure or harden by free radical polymerization of ethylenically unsaturated components of the composition. Reactive fluid adhesive compositions for example are known which cure at room temperature by addition polymerization of monomeric components to provide adhesive bonds between surfaces of various different materials. Reactive fluid adhesive compositions intended to cure between opaque, impervious, or other materials to form an adhesive bond may comprise one or more polymerizable acrylate or methacrylate ester monomers, a source of free radicals such as a peroxide, hydroperoxide, per ester or per acid, and an activator for interaction with the source of free radicals to initiate polymerization of the monomers at room temperature. The source of free radicals and the activator may be stored separate from each other before use of the adhesive. One of them may be incorporated in admixture with the monomers during storage, so that the reactive fluid adhesive composition includes two parts. The composition cures to form an adhesive bond when the two parts are brought together in absence of oxygen.

In one particularly convenient method of using reactive fluid adhesives, one part of the composition comprising the activator is applied to a surface to be bonded in the manner of a primer before the application of the other part of the composition comprising the polymerizable monomers and source of free radicals. This method allows the use of the adhesive composition without having to mix the two parts prior to application. The activator is conveniently one which can be used in non-stoichiometric quantities with respect to the monomers.

Certain known amine-aldehyde reaction products effective as activators in reactive fluid adhesive compositions are liquid materials having a certain degree of toxicity and offensive smell. In view of the increased emphasis on using non-toxic materials, adhesive compositions comprising an activator system having a more acceptable level of toxicity and smell has become particularly desirable. In providing such adhesive compositions, solid materials have been considered. However, solid activators remain present in the bond in their solid form and this feature is not desirable in adhesives of commercially acceptable performance characteristics. Additionally, amine aldehyde reaction products preferred for use as activators in the past have led to cured adhesive bonds which tend to discolor significantly under the influence of light. Any discoloration can be a disadvantage in adhesive bonds which are visible, for example in bonds between glass and other translucent or transparent materials. The present invention is addressed to the outstanding problems in the art discussed above and presents to the art novel improved adhesive compositions comprising activator materials of particularly desirable improved performance characteristics.

SUMMARY OF THE INVENTION

The improved adhesive compositions of the present invention are curable at ambient temperature to form adhesive bonds between opaque, impervious, substrates for example without external application of heat, light or other radiation. The novel, improved adhesive compositions comprise polymerizable acrylic or methacrylic acid esters, a source of free radicals, and an activator comprising an organic material which is easily derived from the readily available leuco sulphuric ester of an indigo or thioindigo dye.

Essentially, activators useful in adhesive compositions of this invention comprise an organic material having in its molecule a moiety or a structural portion shown as FORM 1 below and which can be converted to FORM 2 below.

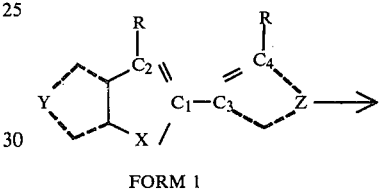

FORM 1

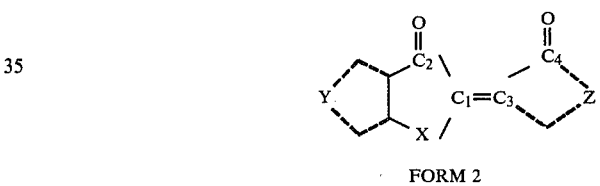

FORM 2 where:

X represents a nitrogen or sulfur in the five-membered ring

Y represents the atoms necessary to complete a substituted or unsubstituted aromatic ring system Z represents the atoms necessary to complete a substituted or unsubstituted aromatic or heterocylic ring system and, R represents the same or different substituent which under adhesive forming conditions and in the presence of free radicals can provide a structure of FORM 2.

Particularly preferred activators include a moiety shown as FORM 1A below:

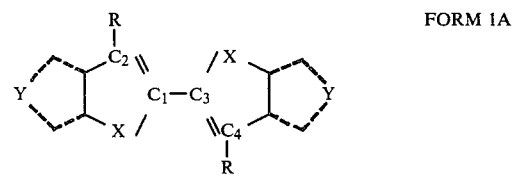

FORM 1A where X, Y and R are as defined before. The structure of FORM 1 and FORM 1A includes position isomers. For Example a position isomer of FORM 1A is as follows:

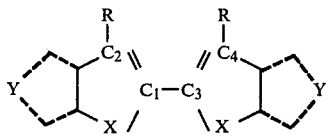

From the above, activators of this invention comprise a five membered ring including a sulphur or nitrogen atom which ring is linked to a substituted or unsubstituted aromatic ring system of the molecule. The sulfur or nitrogen atom is linked to a first carbon atom $C_1$ of the five membered ring and $C_1$ is linked to a second carbon atom of $C_2$ the five membered ring. $C_1$ is also linked to a third carbon atom $C_3$ which is not a member of the five membered ring but is a member of a substituted or unsubstituted aromatic or heterocyclic ring system. The structure is such that the bond between the first and third carbon atoms is a single valence bond. Substituent R is positioned on the second carbon atom $C_2$ and a substituent R is also positioned on a fourth carbon atom $C_4$ which is a member of the second mentioned aromatic or heterocyclic ring system and linked to the third carbon atom $C_3$. R can be the same or different substituent providing the capability for the organic material to undergo conversion under adhesive bond-forming conditions in the presence of the source of free radicals to a diketo form (FORM 2) in which each R has been converted to =O and the bond between the first and third carbon atoms has been converted to a double valence bond.

Formerly referred to as "indigosols", the leuco sulphuric esters providing activators of this invention are also referred to as "solubilized indigoid vat colors" and leuco vat dyestuffs. They are marketed as their sodium salts under various names including "Indigosol" and "Anthrasol".

DESCRIPTION OF THE PREFERRED EMBODIMENT

Preferred activator compounds of the general class referred to include materials derived from the dyestuffs Anthrasol 04B, Anthrasolorange HR, Anthrasolgrau IBL, Anthrasolrosa IR extra, Anthrasolblau AGG, and Anthrasoldruckschwarz. Each of these dyestuffs can be regarded as characterized by a conjugated double bond system common to two ring systems one or both of which is a five membered heterocyclic ring including a nitrogen or sulphur atom. These preferred materials are further characterized in that the aforementioned heterocyclic or aromatic rings are each themselves linked through two carbon atoms of the ring to aromatic rings, at least one of which is a substituted aromatic ring or an element of a substituted ring system. These commercially available dyestuffs are believed to be in the form of the sodium salts of the sulphuric acid ester of their leuco form, and for the purposes of the present invention are converted into a form (hereafter referred to as the active form) in which, in acidic medium (provided by the monomers) they are activators useful in the present invention. It is believed that in the active form the ester groups have been converted to hydroxyl groups, which are oxidizable in acid medium in the presence of a generator of free radicals for example a peroxide, to yield free radicals as shown schematically in Table 2 with respect to Anthrasol 04B.

The preferred activators are solids soluble to an acceptable extent in volatile organic solvent for application to a substrate. They are regarded as odorless, non-toxic materials, and in conjunction with acrylic and methacrylic acid ester monomers and a source of free radicals yield at room temperature adhesive bonds of good strength and performance between opaque impervious substrates of various materials. Adhesive bonds formed with these activator compounds between translucent or transparent materials are also of good strength and performance. While a pale coloring due to the dyestuff may be observed, the adhesive bonds do not become progressively discolored under the influence of light to the same degree as bonds formed by use of activators based on amine-aldehyde reaction products.

The source of free radicals and the activator are stored in separate containers prior to use. Preferably the source of free radicals is included with the polymerizable monomers in a first or adhesive part of the adhesive composition together with inhibitors and stored in polyethylene bottles including a significant quantity of atmospheric oxygen in order to maintain stability of the first part. The activator is preferably stored as a solution in organic solvent to provide a second or activator composition part of the adhesive composition. Preferably the activator composition is stored in dark-colored bottles or in a light impervious aerosol container.

As will be apparent, the activator composition is not required to be mixed in stoichiometric quantities with the adhesive part of the composition. In use, the activator composition and adhesive part of the composition may be mixed together just prior to use, or the activator composition may be applied to one or both substrates and the polymerizable composition later applied to the activator on the substrate. The activator composition preferably comprises sufficient organic solvent so that the activator composition may be readily applied to the substrate such as by brushing to provide a very thin solid deposit after evaporation of the solvent. Alternatively, the activator composition may be packaged with a propellant in an aerosol container from which required quantities may be readily dispensed. Additional materials may be included in the activator composition as required. For example, film forming polymeric material or liquid polymerizable monomer for example a methacrylate ester monomer such as 2-hydroxypropyl methacrylate or trimethylol propane trimethacrylate or a mixture thereof to aid in achieving the required deposit on the substrate.

The activator composition may conveniently comprise up to 5% by weight of the selected organic activator compound in an organic solvent such as acetone or methanol. These activator compositions are effective in the presence of a source of free radicals to bring about cure of polymerizable adhesive compositions comprising one or more ethylenically unsaturated compounds. The time required to bring about setting of the composition is comparatively short, and may be reduced further by inclusion in the activator composition of certain sulphur-containing or transition metal compounds. By the expression "transition metal", we mean a metal which is capable of more than one stable valence state and which is capable of forming complexes such as complexes vanadium chromium, manganese, iron, cobalt, nickel and copper. For rapid setting, mixtures of these materials can be employed. For example, a mixture of 0.1 to 1% by weight of the solution of sulphur-containing compound and 0.05 to 0.5% by weight of the solution of transition metal compound can be employed. The preferred materials are soluble in commonly used organic solvents.

Sulphur compounds for use in activator compositions according to the invention include for example organic thiols, organic disulphides and organic sulphur compounds including also nitrogen in their molecule. Suitable organic thiols (RSH) include dodecylmercaptan, octylmercaptan, phenyldimercaptan and thioglycolic acid. Suitable organic disulphides (R-S-S-R') include phenyldisulphide. Suitable organic compounds also including nitrogen in their molecule include thioacetamide, tetramethylthiouramdisulphide, thiocarbanilide, thiourea, 1-allyl-2-thiourea, 2-mercaptothiazoline, 2-mercaptobenzothiazole and 2,5-dimercapto-1,3,4-thiadiazole.

Transition metal compounds for use in activator compositions according to the invention include compounds including the metal as a chelated compound for example with a $\beta$-diketone or ethylene or propylene diamine, or as a compound of an organic acid or alcohol for example naphenates (e.g. of cobalt, nickel, manganese), octoates (e.g. of copper), hexoates and propionates (e.g. of iron). Preferred materials are acetyl acetonates of vanadium, copper, cobalt and iron.

Polymerizable materials for use in adhesive compositions according to the invention comprise monomers polymerizable by free radical mechanism and preferably comprise one or more acrylate or methacrylate groups per molecule. These materials include the diacrylates and dimethacrylates of mono, di, tri and tetraethylene glycol, tri methacryalates from trihydric alcohols for example trimethylol propane trimethacrylate, hydroxy and glycidyl terminated compounds of acrylic and methacrylic acid for example 2-hydroxypropyl methacrylate, hydroxyethyl methacrylate, glycidyl methacrylate and reaction products of these latter having preferably two or more acrylate or methacrylate terminal groups for example those derived from 2-hydroxy propyl methacrylate and pyromellitic acid dianhydride, and acrylates and methacrylates derived from epoxy resins, and mixtures thereof. Polymers, for example butadiene acrylonitrile, and polymethyl methacrylate may also be included in the adhesive part together with adhesion promoters, acrylic or methacrylic acid, and normal additives for adhesive compositions if desired.

Acrylates and methacrylates preferred for use in the adhesive compositions are tetraethylene glycol dimethacrylate, trimethylol propane trimethacrylate, 2-hydroxypropyl methacrylate, glycidylmethacrylate, and a diacrylate derived from an epoxy resin, and mixtures of two or more thereof.

Inhibitors (e.g. hydroquinone or 2,6,di-t-butyl-4-methyl-phenol) are generally included in the adhesive part to inhibit spurious polymerization of the monomers.

The source of free radicals is maintained separated from the activator composition prior to polymerization and is preferably incorporated in the first (adhesive) part of the composition. Suitable sources of free radicals include organic peroxides (including hydroperoxides) perester and peracids. Preferred materials are cumene hydroperoxide and 2,5-dimethyl-2,5-di-(t-butyl-peroxy)-hexane.

Manners of making and using the invention as well as the advantages to be derived from the practice of the inventin will be better appreciated by reference to the following Examples. These Examples are presented to illustrate the invention and not to limit it.

Each of the adhesive compositions referred to in the following Examples was in two parts. A first or adhesive part comprises one or more polymerizable materials comprising one or more acrylate or methacrylate groups per molecule, and a source of free radicals. A second or activator composition part comprises an activator capable of cooperating with the source of free radicals to bring about curing of the adhesive with exclusion of oxygen to bond impervious substrates together without external application of heat or actinic radiation.

First parts of adhesive composition, fluid at 20° C. were made up using ingredients in amounts by weight as shown in Table I.

TABLE I

| Component | First Part Of Adhesive No. | | |
|---|---|---|---|
| | 1 | 2 | 3 |
| Tetraethylene glycol dimethacrylate | 32 | — | — |
| Trimethylol propane trimethacrylate | 20 | 15 | 30 |
| 2-Hydroxypropyl methacrylate | 30 | 35 | 35 |
| Diacrylate (A) derived from an epoxy resin | — | 30.3 | 15.3 |
| Glycidyl methacrylate | — | 3 | 3 |
| Acrylic acid | 10 | 7 | 7 |
| Pyromellitic acid dianhydride | — | 1.5 | 1.5 |
| Butadiene acrylonitrile rubber (B) | 5 | — | — |
| Butadiene acrylonitrile rubber (C) | — | 5 | 5 |
| Cumene hydroperoxide | 3 | 3 | 3 |
| Hydroquinone | 0.1 | — | — |
| 2.6-di-t-butyl-4-methyl phenol | — | 0.2 | 0.2 |
| | 100.1 | 100.0 | 100.0 |

The diacrylate (A) used was a reaction product of acrylic acid and an epoxy resin (from epichlorhydrin and bisphenol A having an epoxide equivalent weight of 182 to 194 and a viscosity at 25° C. of 100 to 150 poise) in a molar ratio of 2:1. The reaction product is believed to comprise a significant amount of difunctional material comprising two functional acrylate groups per molecule.

The butadiene acrylonitrile rubber (B) used was Perbunan N3807NS supplied by Bayer AG. The butadiene acrylonitrile rubber (C) used was Hycar 1401H80 supplied by Goodrich Company.

These first parts of adhesive compositions were made up by dissolving the rubber in a mixture of the di- and tri- methacrylate monomers, the 2-hydroxypropyl methacrylate and the inhibitor. The rubber (C) can be dissolved in this mixture directly at 75° C. The rubber (B) however must first be dissolved in methylene chloride and this solution mixed with the mixture of di- and tri- methacrylate monomers, 2-hydroxypropyl methacrylate and inhibitor, and then the methylene chloride removed under vacuum. The pyromellitic acid dianhydride was added to the mixture including the rubber and this mixture heated to 80° C. for two hours in order to obtain a reaction product from the dianhydride and 2-hydroxypropyl methacrylate molecules. Finally, after the mixture had cooled to room temperature, the glycidyl methacrylate, acrylic acid, and cumene hydroperoxide, were added.

Various activator compositions were made up by dissolving various leuco vat dyestuffs supplied under the name Anthrasol in methanol as solvent. The precipitate formed (presumed to be sodium sulphate) was filtered off and the remaining solution, including the active form, used in the following tests. Structural formulae believed to show the Active Form of these dyestuff materials in the solution, and an Oxidized Form of the Active Form produced in reaction with a hydroperoxide to yield free radicals and water are shown in Tables 2 and 3. It will be apparent that each of these Active Forms consists of an organic material comprising in its molecule a five membered ring including a sulphur or nitrogen atom which ring is linked to a substituted or unsubstituted aromatic ring system. The sulfur or nitrogen atom is linked to a first carbon atom of the five membered ring and the first carbon atoms is linked to a second carbon atom of the five membered ring. The first carbon atom is also linked to a third carbon atom which is not a member of the five membered ring but is a member of a substituted or unsubstituted aromatic or heterocyclic ring system. The structure is such that the bond between the first and third carbon atoms is a single valence bond. Substituent R is positioned on the second carbon atom and a substituent R is also positioned on a fourth carbon atom which is a member of the second mentioned aromatic or heterocyclic ring system and linked to the third carbon atom. R can be the same or different substituent providing the capability for the organic material to undergo conversion under adhesive bond-forming conditions in the presence of the source of free radicals to diketo form in which each R has been converted to =O and the bond between the first and third carbon atoms has been converted to a double valence bond. In Tables 2 to 8, the active forms I to VI are derived from Anthrasol materials as follows:

| Active Form No. | Derived from |
| --- | --- |
| I | Anthrasol 04B |
| II | Anthrasolorange HR |
| III | Anthrasolgrau IBL |
| IV | Anthrasolrosa IR Extra |
| V | Anthrasol Blau GG |
| VI | Anthrasoldruckschwarz IGR |

In Examples 1 to 4 the solutions were made up using 1% by weight in the solution of the selected Anthrasol materials. In the solutions of Example 2, 0.5% by weight of selected organic sulphur compounds were used in addition to the Anthrasol materials. In the solutions of Example 3, 0.1% by weight of transition metal compound were used in addition to the Anthrasol material. In the solutions of Example 4, 0.5% by weight organic sulphur compound and 0.1% by weight of a transition metal compound, were used in addition to the Anthrasol material. Ingredients of the activator compositions are shown in Tables 4, 5, 6, and 7.

EXAMPLES 1, 2, 3 AND 4.

The setting time of various adhesive-activator combinations at standard room temperature (23° C.+2° C.) and humidity fo about 50% was determined on glass plate substrates. The glass was solvent wiped, and a thin layer of the activator applied to one of the surfaces to be bonded and the solvent allowed to evaporate. First Part Of Adhesive No. 1 of Table 1 was applied as a thin layer and the glass plates pressed together in partially overlapping relation with the adhesive between them, and with air excluded from the adhesive composition by pressing the substrate firmly together. The bonds were tested by pulling the glass plates apart by hand. When this could no longer be done, the adhesive was regarded as set. The shortest time after which the bonds could not be opened manually was recorded as the setting time. The results are shown in Tables 4, 5, 6 and 7 below. It was observed that the time within which the activators retained their activating ability after application to the surface was of the order of two hours.

| TABLE 2 |
| --- |
| STRUCTURAL FORMULAE |

ANTHRASOL 04B

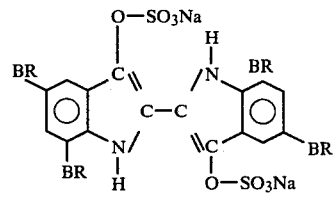

ACTIVE FORM I FROM ANTHRASOL 04B

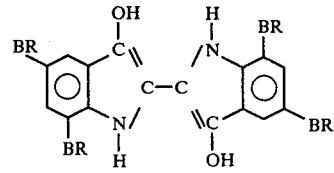

[H+]
2 ROOH

TABLE 2-continued

STRUCTURAL FORMULAE

OXIDIZED FORM FROM ANTHRASOL O4B

[Structure: dibrominated bis-aryl compound with C=C bridge, two C=O groups, two N-H groups, +2RO +2H₂O]

TABLE 4

Results of Example 1 - setting time

| Activator containing active form No. | Setting Time |
|---|---|
| I | 1 to 1½ hours |
| II | 1 to 1½ hours |
| III | 1 to 1½ hours |
| IV | 1 to 1½ hours |
| V | 1 to 1½ hours |
| VI | 50 minutes |

TABLE 3

STRUCTURAL FORMULAE

| ACTIVE FORM NO. | ACTIVE FORM | OXIDIZED FORM |
|---|---|---|
| II | [bis-aryl structure with OH, OC₂H₅, S substituents] | [oxidized bis-aryl with C=O groups, C=C bridge, OC₂H₅, S, H₅C₂O] + 2R—O. + 2H₂O |
| III | [bis-aryl structure with OH, Br, Cl, S substituents, naphthalene ring] | [oxidized form with C=O, C=C, Br, Cl, S] + 2R—O. + 2H |
| IV | [bis-aryl with CH₃, OH, Cl, S substituents] | [oxidized bis-aryl with CH₃, C=O, Cl, S, C=C] + 2R—O. + 2H₂O |
| V | [aryl-naphthalene structure with Cl, CH₃, OH, N, OCH₃] | [oxidized form with Cl, CH₃, C=O, quinone structure, OCH₃] + 2R—O. + 2H₂O |
| VI | [complex aryl-naphthalene structure with OH, N-H, CH₃] | [oxidized form with C=O, quinone, N-H, CH₃] + 2R—O. + 2H₂O |

TABLE 5

Results of Example 2 - setting time

| Sulphur-containing compound | Active form No. | | | |
|---|---|---|---|---|
| | I | III | V | VI |
| Dodecylmercaptan | 50 min. | 25 min. | 90 min. | 30 min. |
| Thioglycolicacid | 3 min. | 4 min. | 10 min. | 7 min. |
| Tetramethyl-thiuramdisulphide | 6 hours | 6 hours | 6 hours | 6 hours |
| Thiocarbanilide | 15 min. | 15 min. | 15 min. | 15 min. |
| Allylthiourea | 4.5 min. | 3.5 min. | 2.5 min. | 5 min. |
| 2,5-dimercapto-1,2,4-thiadiazol | 16 min. | 11 min. | 23 min. | 21 min. |
| 2-mercapto-benzthiazol | 2½ hrs. | 1 hour | 2 hours | 1½ hrs. |

TABLE 6

Results of Example 3 - setting time

| | Transition Metal Compound | |
|---|---|---|
| Active form: | Va (III) acetylacetonate 0.1% in methanol | Cu (II) acetylacetonate 0.1% in methanol |
| I | 11 min. | 75 min. |
| III | 14 min. | 30 min. |
| V | 9 min. | 70 min. |
| VI | 7 min. | 28 min. |

TABLE 7

Results of Example 4 - setting time

Organic sulphur compound and transition metal compound

| | 0.5% allyl thiourea | | 0.5% thioglycolic acid | | 0.5% thiocarbanilide | |
|---|---|---|---|---|---|---|
| Active form | +0.1% Va—AcAc | +0.1% Cu—AcAc | +0.1% Va—AcAc | +0.1% Cu—AcAc | +0.1% Va—AcAc | +0.1% Cu—AcAc |
| I | 20 sec. | 1¼ min. | 30 sec. | 13¼ min. | 45 sec. | 1½ min. |
| III | 20 sec. | 1¼ min. | 30 sec. | 15 min. | 45 sec. | 1 min. |
| V | 20 sec. | 1½ min. | 30 sec. | 13 min. | 45 sec. | 2 min. |
| VI | 20 sec. | 1½ min. | 30 sec. | 11 min. | 45 sec. | 1½ min. |

(Va—AcAc means Vanadium III acetyl acetonate)
(Cu—AcAc means Copper II acetylacetonate)

From the results of Examples 1 to 4 it can be seen that a setting time of less than two hours at room temperature of the First Part of Adhesive No. 1 of Table 1 and activator combination can be achieved with the selected dyestuff derivatives. Further it can be seen that setting times at room temperature can be reduced by inclusion of selected sulphur compounds or transition metal compounds alone or in combination. Thus by appropriate selection of materials, setting times at room temperature of a few seconds or several minutes or even hours may be achieved.

It should be noted that the setting times were measured on glass substrates in order that the comparison between various combinations of adhesive part and activator part should not be unduly influenced by possible catalytic effect of the substrate surface on the curing reaction. In practice, these adhesive compositions are required to be capable of use to give satisfactory adhesive bonds by curing at room temperature in bonds using any of a variety of substrate materials some of which (e.g. steel, copper, brass and stanless steel) are likely to have a significant effect in reducing the setting time and some of which (e.g. chromium, zinc and tin) are likely to have less effect or even no significant effect (e.g. pvc) on the setting time.

A further factor requiring consideration is the desirability for the adhesive compositions to be capable of use and performance with various impervious, opaque or transparent materials without additional use of externally applied heat, light or other curing treatment under a variety of normal ambient temperature conditions ranging at least from about 5° C. to 30° C.

EXAMPLE 5

In order to examine the strength of adhesive bonds formed using adhesive compositions according to the invention, First Part of Adhesive No. 2 and No. 3 of Table 1were used in conjunction with two selected activator compositions to bond various substrates at standard room conditions (23° C.+2° C., and about 50% RH). The amounts of ingredients used in the selected activator compositions are shown in Table 8 in parts by weight.

TABLE 8

| Component | Activator Compositions | |
|---|---|---|
| | (a) | (b) |
| Anthrasol Blau AGG | 1.5 | 1.5 |
| 2-hydroxypropyl methacrylate | 1.5 | 3.0 |
| Trimethylol propane trimethacrylate | 1.5 | — |
| Allyl thiourea | 1.5 | 1.5 |
| Vanadium (IV) oxide-acetyl acetonate | 0.3 | — |
| Acetyl acetone | 0.3 | — |
| Methanol | 93.4 | 94.0 |
| | 100.0 | 100.0 |

These activator compositions were made by dissolving the Anthrasol Blau AGG in the methanol, with agitation and then allowing the mixture to stand at room temperature for 2 hours. The precipitate was removed, and then the remaining components were added to the solution with stirring. The solutions were charged into dark colored glass bottles having a screw cap with a brush fixed to the inside of the cap.

The setting time on glass at room temperature was determined with many samples in the manner set out above, using First Part of Adhesive No. 1 and No. 2 of Table I together withe example activator compositions (a) and (b). The ranges of results are shown in Table II.

Sample bonds were prepared and subjected to tests to determine tensile shear strength, peel strength and impact strength of the bonds. The sample bonds were prepared in the following way, using substrate materials prepared as shown in Table 9. Pairs of coupons of the prepared substrates 100 mm ×25.4 mm were brushed with the activator solution and allowed to dry, the solution leaving a thin layer of activator compound on each coupon weighing about 5 to 10 mg. per square centimeter. The First Pair of Adhesive was applied to only one of the coupons, and the pair of coupons aligned and pressed together to exclude air and to provide an overlap of 12.7 mm with the adhesive between the overlapped portions in a layer approximately 0.1 mm thick.

Tensile shear strength of sample bonds was determined at 23° C. (in Newtons per square millimeter) 24 hours after forming the sample bonds; the bonds being aged at b 23° C. An Instron machine set to tear the bonds apart at 1 mm per minute was used. The force required is recorded in Table 10.

Peel strength of sample bonds aged at 23° C. for 24 hours was determined at 23° C. using a 90° peel angle and a separation rate of 30 mm per minute. The force required to initiate separation of the bonds is recorded in Table II as "initial", and the force required to continue separation of the bonds is recorded in Table II as "peel".

Impact strength of sample bonds was determined at 23° C. by an impact pendulum according to ASTM-D 950-72. The overlapping area was one square inch. The samples were aged for 24 hours at 23° C. before testing. The results are shown in N.cm/cm$^2$ in Table II.

For many purposes in adhesive work tensile shear strength results of about 4 N/mm$^2$ or more are regarded as satisfactory, and it will be observed from Table 9 that values of this order can be achieved using adhesive compositions according to the present invention with several different materials appropriately prepared for bonding. The peel and impact test results show the adhesive compositions of the present invention are likely to be satisfactory for many purposes.

TABLE 9

| Example 5 Surfaces and preparation treatments | |
|---|---|
| Substrate No. | Material and Treatment |
| 1 | Mild steel; degreased and sand blasted. |
| 2 | Mild steel; oily surface untreated. |
| 3 | Mild steel; rinsed with acetone and dried. |
| 4 | Aluminium; sand blasted. |
| 5 | Aluminium; pickled and dried. |
| 6 | Aluminium; rinsed with acetone and dried. |
| 7 | Brass; sand blasted. |
| 8 | Brass; rinsed with acetone and dried. |
| 9 | Chromium plated steel; sand blasted |
| 10 | Chromium plated steel; rinsed with acetone and dried |
| 11 | Cadmium plated steel; rinsed with acetone and dried. |
| 12 | Stainless steel; rinsed with acetone and dried. |
| 13 | Tin plated steel; rinsed with acetone and dried. |
| 14 | Zinc plated steel; sand blasted. |
| 15 | Zinc plated steel; rinsed with acetone and dried. |
| 16 | Copper; sand blasted. |

TABLE 9-continued

| Example 5 Surfaces and preparation treatments | |
|---|---|
| Substrate No. | Material and Treatment |
| 17 | Copper; rinsed with acetone and dried. |
| 18 | PVC; solvent wiped. |
| 19 | Glass; solvent wiped. |

TABLE 10

Example 5 - Tensile shear strength (N/mm$^2$)

| Example first part of adhesive | Example activator composition | Substrate No. | | | | | | | | | | | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| 2 | a | | 8.18 | | 10.0 | 21.4 | 5.07 | 16.3 | 7.5 | 6.0 | 6.88 | 11.7 | 14.9 | 9.74 | 9.5 | 5.8 | 9.1 | 0.76 | 0.68 | 4.93 |
| 3 | a | | 7.63 | | | 11.2 | 2.11 | | 4.84 | | 2.6 | 6.82 | 6.0 | 5.45 | | 5.6 | | 0.91 | 0.93 | 3.13 |

TABLE 11

| Example 5 — Setting time. Peel Strength Impact Strength. | | | | | |
|---|---|---|---|---|---|
| Example first part of adhesive | Example activator composition | Setting Time Substrate No. 19 (seconds) | Peel Strength Substrate No. 3 (N/30mm) | | Impact Strength Substrate No. 1 (N · cm/cm$^2$) |
| | | | Initial | Peel | |
| 2 | a | 10 to 20 | 15.3 | 2.9 | 77 |
| 2 | b | 90 to 180 | | | |
| 3 | a | 10 to 20 | 4.9 | 2.5 | 29 |
| 3 | b | 90 to 180 | | | |

Having thus described my invention, what I claim as new and desire to secure by Letters Patent of the United States is:

1. An adhesive composition formed by combining two parts, one part including one or more polymerizable materials comprising one or more acrylate or methacrylate groups per molecule, a source of free radicals comprising an organic peroxide, hydroperoxide, perester or peracid, and the other part includes an activator which can cooperate with the source of free radicals to initiate addition polymerization of the polymerizable materials and where the said activator comprises an organic material having a structure shown in FORM 1 below:

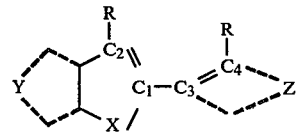

FORM 1 where X represents a nitrogen or sulfur atom;
Y represents the atoms necessary to complete a substituted or unsubstituted aromatic ring system;
Z represents the atoms necessary to complete a substituted or unsubstituted ring system or a substituted or unsubstituted five membered heterocyclic ring system in which $C_3$ is bonded to a nitrogen or sulfur atom and
R represents the same or different substituent which under adhesive forming conditions and in the presence of free radicals provide a structure of FORM 2 below:

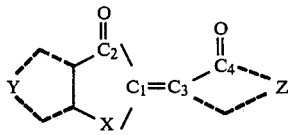
FORM 2

2. A composition of claim 1 where FORM 1 of the activator is chosen from the group consisting of:

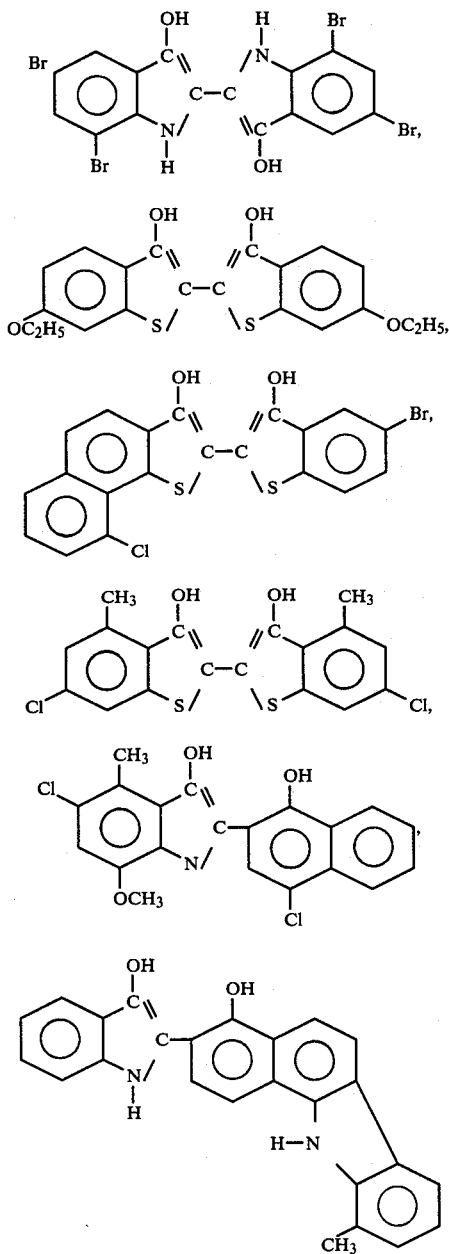

and a mixtures of these.

3. An adhesive composition of claim 1 where the one part includes the reaction product 2 hydroxypropyl methacrylate and pyromellitic acid dianhydride.

4. An adhesive composition of claim 1 where the other part also comprises a sulphur containing compound or a transition metal compound or a mixture of these.

5. An adhesive composition of claim 2 where the other part also comprises a sulfur containing compound or a transition metal compound or a mixture of these.

6. An adhesive composition of claim 4 where the sulfur containing compound comprises an organic thiol, disulphide or a compound containing also nitrogen in its molecule.

7. An adhesive composition of claim 5 where the sulfur containing compound comprises an organic thiol, disulphide or a compound also containing nitrogen in its molecule.

8. An adhesive composition of claim 4 where the metal compound comprises vanadium (III) acetonyl acetonate, copper (II) acetonyl acetonate, or vanadium (IV) oxide-acetyl acetonate.

9. An adhesive composition of claim 5 where the metal compound comprises vanadium (III) acetonyl acetate, copper (II) acetonyl acetonate or vanadium (IV) oxide-acetyl acetonate.

10. An adhesive composition of claim 1 where the activator is dissolved in volatile organic solvent.

11. An adhesive composition of claim 10 where the other part also comprises a polymerizable methacrylate ester monomer.

12. An adhesive composition of claim 11 wherein the polymerizable methacrylate ester monomer comprises 2-hydroxypropyl methacrylate or trimethylol propane trimethacrylate or a mixture thereof.

13. An adhesive composition of claim 1 where said one or more polymerizable materials comprises tetraethylene glycol dimethacrylate, trimethylol propane trimethacrylate, 2-hydroxypropyl methacrylate, glycidyl methacrylate, a diacrylate derived from an epoxy resin or mixture of two or more of these.

14. An adhesive composition of claim 1 where the one part also comprises acrylic acid, and the source of free radicals comprises cumene hydroperoxide.

15. An adhesive composition of claim 1 where the one part also comprises a butadieneacrylonitrile copolymer.

16. An adhesive composition of claim 1 where the other part includes about 1.5 parts by weight of 2-hydroxypropyl methacrylate, about 1.5 parts by weight trimethylol propane trimethacrylate, about 1.5 parts by weight allyl thiourea, about 0.3 parts by weight vanadium (IV) oxide-acetyl acetonate, about 0.3 parts by weight acetyl acetone, about 93.4 parts by weight methanol and about 1.5 parts by weight of said activator which is an organic material of the following structure:

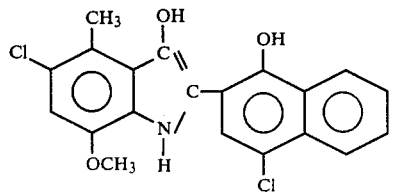

17. An adhesive composition of claim 1 where the other part includes about 3.0 parts by weight 2-hydroxypropyl methacrylate, about 1.5 parts by weight of allyl thiourea, about 94 parts by weight methanol and about 1.5 parts by weight of said activator which is an organic material of the following structure:

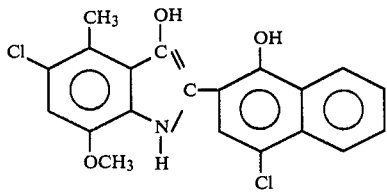

18. An adhesive composition of claim 1 where the one part includes about 32 parts by weight tetraethylene glycol dimethacrylate, about 20 parts by weight trimethylol propane trimethacrylate, about 30 parts by weight 2-hydroxypropyl methacrylate, about 10 parts by weight acrylic acid, about 5 parts by weight butadiene acrylonitrile rubber, about 3 parts by weight cumene hydroperoxide and about 0.1 parts by weight hydroquinone.

19. An adhesive composition of claim 1 where the one part includes about 15 parts by weight trimethylol propane trimethacrylate, about 35 parts by weight 2-hydroxypropyl methacrylate, about 30.3 parts by weight of a diacrylate derived from an epoxy resin, about 3 parts by weight glycidyl methacrylate, about 7 parts by weight acrylic acid, about 1.5 parts by weight pyromellitic acid dianhydride, about 5 parts by weight butadiene acrylonitrile rubber, about 3 parts by weight cumene hydroperoxide and about 0.2 parts by weight 2,6-di-t-butyl-4-methyl phenol.

20. An adhesive composition of claim 1 where the one part includes about 30 parts by weight trimethylol propane trimethacrylate, about 35 parts by weight 2-hydroxypropyl methacrylate, about 15.3 parts by weight of a diacrylate derived from an epoxy resin, about 3 parts by weight glycidyl methacrylate about 7 parts by weight acrylic acid, about 1.5 parts by weight pyromellitic acid dianhydride, about 5 parts by weight butadiene acrylonitrile rubber, about 3 parts by weight cumene hydroperoxide and about 0.2 parts by weight 2,6-di-t-butyl-4-methyl phenol.

21. A composition of claim 1 where the activator is an organic material having the following structure:

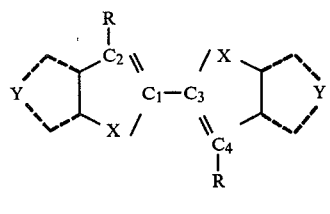

* * * * *

UNITED STATES PATENT OFFICE
CERTIFICATE OF CORRECTION

Patent No. 4,343,921                Dated August 10, 1982

Inventor(s) Gerhard Piestert

It is certified that error appears in the above-identified patent and that said Letters Patent are hereby corrected as shown below:

Claim 1 - Column 14, Line 61 - before "ring system" insert "aromatic"

Claim 1 - Column 14, Line 67 - change "provide" to "provides"

Signed and Sealed this

Twelfth Day of October 1982

|SEAL|

Attest:

Attesting Officer

GERALD J. MOSSINGHOFF
Commissioner of Patents and Trademarks